Aug. 16, 1932.   A. W. NEVERMAN   1,872,092
ELECTRIC GAS TANK LOCK
Filed June 10, 1931
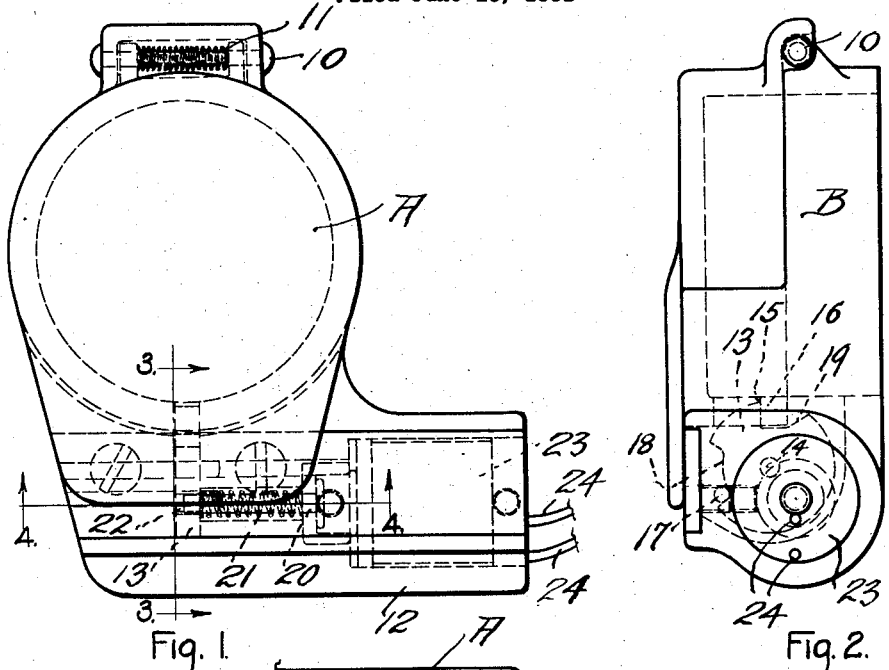
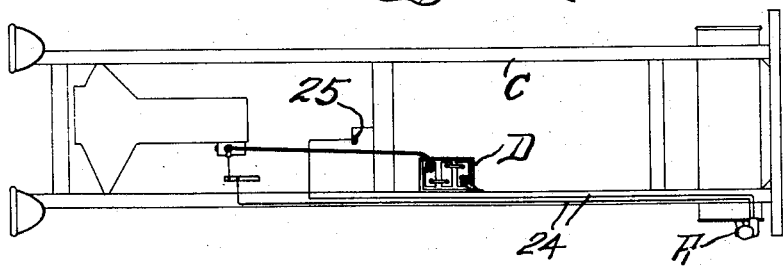
INVENTOR.
AUGUST W NEVERMAN
BY
ATTORNEY.

Patented Aug. 16, 1932

1,872,092

UNITED STATES PATENT OFFICE

AUGUST W. NEVERMAN, OF GREEN BAY, WISCONSIN

ELECTRIC GAS TANK LOCK

Application filed June 10, 1931. Serial No. 543,465.

The invention relates to a gas tank filling cap locking device, and more especially to an electrically controlled lock for gas tank caps used on automobiles or the like.

The primary object of the invention is the provision of a locking device of this character, wherein the operator of an automobile can through the pressing of a button which is in convenient reach upon the dash of said automobile release the lock for the filling cap on the gas tank at the rear of such automobile.

Another object of the invention is the provision of a locking device of this character, wherein the cap for the filling tank or gas tank on the automobile cannot be opened or released, except by a control key for the electric ignition system installed in the automobile, and in this manner wrongful access to the tank is retarded and theft of the gas as may be contained therein.

A further object of the invention is the provision of a locking device of this character, wherein the construction and the assembly of the same is novel in form and the gas cap is under the control of the operator of the automobile, and thus eliminates wrongful access to the gas tank on such automobile, as the cap cannot be opened unless there is possession of the proper key to the electric ignition system installed in such automobile.

A still further object of the invention is the provision of a locking device of this character, which is extremely simple in construction, thoroughly reliable and efficient in operation, strong, durable, susceptible of operation with dispatch, controlled by an operator of such automobile, and inexpensive to manufacture and install.

With these and other objects in view the invention consists in the features of construction, combination and arrangement of parts as will be hereinafter more fully described in detail, illustrated in the accompanying drawing which discloses the preferred embodiment of the invention, and pointed out in the claim hereunto appended.

In the accompanying drawing:

Figure 1 is a top plan view of a gas tank filling cap with the locking device constructed in accordance with the invention applied thereto.

Figure 2 is an end or side elevation of the same.

Figure 3 is an enlarged sectional view taken on the line 3—3 of Figure 1 looking in the direction of the arrows.

Figure 4 is a detail sectional view on the line 4—4 of Figure 1.

Figure 5 is a diagrammatic view in plan of an automobile chassis, the gas tank thereon, battery and electric connections with the ignition system for the locking device.

Similar reference characters indicate corresponding parts throughout the several views in the drawing.

Referring to the drawing in detail A designates generally the cap for the filling tank for gasoline and this tank is carried ordinarily at the rear of an automobile and may be of any standard type, the cap being swingingly carried on a collar B which is secured in any desirable manner about the mouth of a filling spout for the tank. The cap A swings on a hinge 10, which is provided with a tensioning spring 11, to maintain the said cap in opening position on the spout.

The collar B is formed with a lock casing or housing 12 in which is arranged a vertically disposed rotatable locking bolt 13, the latter being supported by an axle 14 suitably journaled in the casing or housing. This bolt 13 is provided with a locking notch 15, into which is received a keeper lug or lip 16 on the cap A, while the bolt is limited in its rotary movement by the use of a stop pin 17 working in a slot 18 in the periphery of said bolt which is of disk form. The edge 19 of the notch 15 confronting the lug or lip 16 in the closing movement of the cap A is beveled so that such lug or lip will cause the rotation of the bolt to move it to locking position when the cap is swung to closing position on the spout.

Arranged in a guideway in the casing of housing 12 is a slidable locking dog 20, which is moved toward the disk or bolt 13 by a spring 21 to engage in a hole or opening 22 in said bolt and this dog when engaged with the bolt holds it fast and the cap locked closed.

Within the casing or housing 12 is an electric magnet 23 which when energized will attract the bolt 20 to release the same against the tension of the spring 21 from the bolt 13 to free the latter and unlock the cap A. This magnet 23 has the electric wires 24 thereof arranged in the electric ignition system installed in an automobile C, which system includes the battery D and the circuit of such system is controlled by a key operated switch 25, the latter being ordinarily mounted on the dash or instrument board of the automobile in convenient reach of the operator thereof.

It should be obvious that it is necessary to use the key for the switch 25 controlling the ignition system installed in the automobile for operating the locking device whereby the locking dog 20 will be under the influence of the magnet 23 which when energized will attract the dog and move it to releasing position to free the bolt 13 so that the cap will be unlocked to allow the opening thereof by the raising of the same from the collar B for the filling of the gas tank in the usual manner through its filling spout.

When the magnet 23 is deenergized the spring 21 becomes active against the dog 20 so that when the bolt 13 is moved on the downward movement of the cap A by the lug or lip 16 engaging in the notch 15 in said bolt the locking dog 20 will engage in the hole or opening 22 in the latter and thus hold fast said bolt and thus lock the cap closed.

What is claimed is:

In a device of the kind described, a collar adapted to be made fast to a filling spout of a tank, a cap having hinge connection with the collar, a lock casing built on the casing at the side thereof opposite the hinge connection, a rotatable bolt in the casing for engaging and disengaging the cap, and having a notched portion, a pin in the casing and within the notched portion to limit the rotation of the bolt, a dog insertable in the bolt, and an electric magnet in the casing and adapted to be arranged in a normally open electric circuit whereby on closing the latter the dog will be released from the bolt, the dog being moved by the cap on opening and closing of the latter to bring said bolt to unlatching and latching positions.

In testimony whereof, I affix my signature.

AUGUST W. NEVERMAN.